United States Patent

Wu et al.

[15] 3,706,137

[45] Dec. 19, 1972

[54] FLOATED PENDULOUS GYROCOMPASS

[72] Inventors: Joseph Wu, Sherman Oaks, Calif.; Joseph Rae Conway, Shaker Heights, Ohio

[73] Assignee: TRW Inc., Redondo Beach, Calif.

[22] Filed: Oct. 27, 1969

[21] Appl. No.: 869,569

[52] U.S. Cl. ................................33/226, 33/72
[51] Int. Cl. ......................G01c 19/38, G01c 1/02
[58] Field of Search .............33/72 G, 226, 222 CD

[56] References Cited

UNITED STATES PATENTS

| | | | |
|---|---|---|---|
| 1,445,279 | 2/1923 | Henderson | 33/226 |
| 1,886,606 | 11/1932 | Thompson et al. | 33/226 |
| 2,647,233 | 7/1953 | Kutzler | 33/222 CD X |
| 2,734,280 | 2/1956 | Christoph | 33/226 |
| 2,810,291 | 10/1957 | Bishop et al. | 33/226 X |
| 2,854,850 | 10/1958 | Braddon | 33/226 UX |
| 3,162,951 | 12/1964 | Hintze et al. | 33/72 G |
| 3,283,408 | 11/1966 | Rothe et al. | 33/72 G |
| 3,292,269 | 12/1966 | Brugger | 43/326 |
| 3,419,967 | 1/1969 | Rocks et al. | 33/72 G X |
| 3,512,264 | 5/1970 | Ambrosini | 33/226 |

FOREIGN PATENTS OR APPLICATIONS

| | | | |
|---|---|---|---|
| 8,394 | 1884 | Great Britain | 33/226 |
| 146,372 | 5/1921 | Great Britain | 33/226 |

OTHER PUBLICATIONS

Zimmerman & Lavine Handbook of Material Trade Names 1953 Edition TP 151 Z5 (Page 240)

*Primary Examiner*—Robert B. Hull
*Attorney*—Daniel T. Anderson, Harry I. Jacobs and Gerald Singer

[57] ABSTRACT

A pendulous gyrocompass wherein the gyro pendulum assembly is supported by a spherical float partially submerged in a bath of halocarbon oil. A set of pickoffs senses the precession of the gyro pendulum and causes a theodolite to follow-up the pendulum assembly so that the theodolite aligns to true north. A detachable pendulum arm is provided to give the advantage of a long pendulum arm for accuracy and a short pendulum arm for transit and storage.

1 Claim, 3 Drawing Figures

INVENTORS
Joseph Wu
Joseph Rae Conway
BY
ATTORNEY

FLOATED PENDULOUS GYROCOMPASS

BACKGROUND OF THE INVENTION

In certain current pendulous gyrocompass designs the mechanical pendulum and gyro are supported by a wire suspension system. The torque gradient of the wire must be small enough to allow precession of the gyro pendulum, and as a result the wire must be extremely thin and relatively long. The known stability of such a wire is adversely affected by material creep, load strain, temperature change, hysteresis and mechanical shocks due to handling.

In other pendulous gyrocompass designs the mechanical pendulum and gyro are gimbaled to the frame of a binnacle. Such a gimbaled system produces bias or hysteresis torque in the suspension which opposes the gyro precession torque, thus creating error. Attempts have been made to use hydrostatic support techniques to eliminate the problem of bias or hysteresis torque yet still provide satisfactory suspension of the pendulum and gyro. One example of such a gimbaled, pendulous gyrocompass is described in U.S. Pat. No. 3,292,269 by Richard G. Brugger.

In the Brugger gyrocompass the movable components are buoyantly supported by a fluid to relieve the weight loading on the bearings. The mechanical pendulum and gyro, however, are gimbaled to the binnacle and therefore create bias or hysteresis torque in the suspension which opposes the gyro precession torque.

If the pendulum is attached to a hollow sphere which in turn is buoyantly floated in a fluid, the problem of bias or hysteresis torque is overcome.

SUMMARY OF THE INVENTION

In accordance with the structural aspects of an example of the present invention, a gyrocompass sensor consisting of a pendulous assembly fixed to a hollow sphere is buoyantly floated in a halocarbon oil. The pendulous assembly contains an inertial element comprising a fixed high angular momentum wheel which seeks alignment to true north.

The pendulum and fluid are contained in a follow-up assembly which has rotational freedom about a vertical axis. The follow-up assembly accurately tracks the pendulum in azimuth by means of electromagnetic position pickoffs and a position servo loop. A theodolite may be mounted on the upper surface of the follow-up assembly and aligned with the angular momentum vector of the pendulum to provide an optical azimuth readout. The follow-up assembly additionally serves to maintain zero torsion on the fine lead wires which transmit power to the spin motor of the high angular momentum wheel.

Electromagnetic damping coils may be provided to obtain optimal convergence to true north. The damping torque to the coil is a function of the velocity of the follow-up assembly as determined by a tachometer fixed to the servo drive motor which powers the follow-up assembly.

DESCRIPTION OF THE PREFERRED EMBODIMENTS

Figure 1:
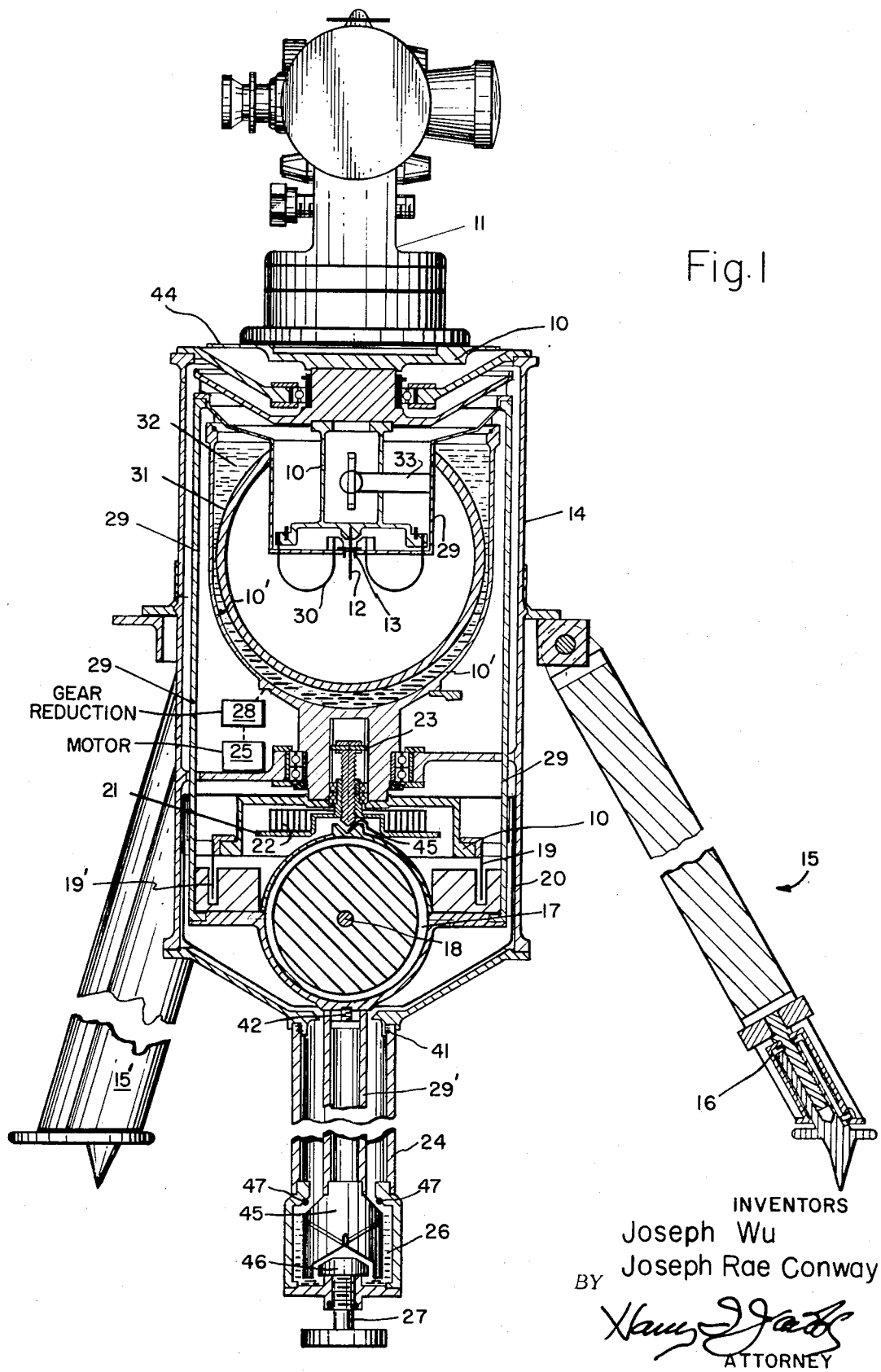
FIG. 1 is a cross sectional view of a presently preferred embodiment of the invention.

FIG. 1 shows an example of the invention which includes a follow-up assembly 10 having a theodolite 11 attached thereto. In this example the follow-up assembly and theodolite are rotatably mounted upon a binnacle or sensor housing 14. Binnacle or sensor housing 14 is supported by a tripod 15 which is leveled by leveling screws 16. In use, tripod legs 15' are extended and leveling screws 16 are adjusted to level the line of sight of theodolite 11, and follow-up assembly 10 rotates about a vertical axis. See U.S. Pat. No. 1,445,279 to J. B. Henderson which shows a slot type limited-motion interconnection of parts similar to the interconnection of a lower part 10' of the follow-up assembly with upper part 10 through a slot cut into a pendulum arm 29.

Figure 2:
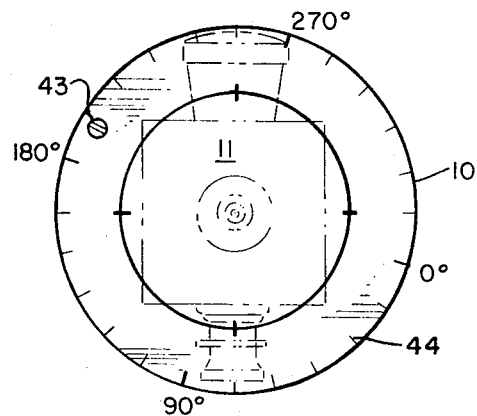
FIG. 2 is a top view of the preferred embodiment of the invention shown in FIG. 1.

Referring to FIG. 2, a compass card 44 is mounted on top of follow-up assembly 10. Theodolite 11 is capable of rotation with respect to compass card 44, or it may be rigidly attached to follow-up 10 by means of screw 43.

Referring again to FIG. 1, a container section 10' of follow-up assembly 10 is filled with a Newtonian fluid 32, which may be a halocarbon oil: a Newtonian fluid being any fluid having a linear stress versus deformation rate characteristic.

A hollow, spherical float, 31, having pendulum arms 29 and 29' serially attached thereto is floated in Newtonian fluid 32.

As shown in FIG. 1, pendulum arm 29' is a hollow tube having a screw thread 42 at the top, and a heavy mass 45 attached at the bottom. A caging screw 27 is provided for locking pendulum arm 29' in place. When caging screw 27 is tightened, stop 46 is forced against a slot in mass 45. When screw 27 is tightened, mass 45 is forced up against O-ring 47.

To disengage pendulum arm 29' from pendulum arm 29, detachable lower housing 24 is unscrewed via screw threads 41. Caging screw 27 is then tightened to bring stop 16 against mass 45 and tighten mass 45 against O-ring 47. The entire lower assembly is then detached by unscrewing pendulum arm 29' from pendulum arm 29 via screw threads 42. To reattach the lower portion, the above procedure is reversed.

When detachable pendulum arm 29' is attached, the mechanical advantages of a long pendulum arm are realized. The detachable feature provides the advantages of a short pendulous arm with respect to problems of transit and storage.

Spherical float 31 is centered within container 10' by means of pivot 12 and jewel 13. Pivot 12 is attached to follow-up assembly 10, and jewel 13 surrounds the pivot and is attached to pendulum arm 29 which is in turn attached to spherical float 31. Lateral motion is kept to a minimum due to pivot 12. Jeweled bearing 13 tends to eliminate extraneous torque factors. Spherical float 31 is permitted to move up and down within fluid 32 along pivot 12. Thus spherical float 31 is permitted vertical but not lateral motion.

A conventional north seeking gyro contained within pendulum arm 29 is powered by spin motor 17 which rotates about spin axis 18. Power is applied to gyro spin motor 17 via flex leads 30. Flex leads 30 make an electrical connection between follow-up assembly 10 and pendulum arm 29. As follow-up 10 rotates with respect to pendulum arm 29, the flex leads supply power to spin motor 17 without the use of brushes. Flex leads 30 are very thin so that bias torque placed on follow-up assembly 10 as it rotates with respect to pendulum arm 29 is minimized. As will be seen later, follow-up assembly 10 and pendulum arm 29 both align with respect to each other and relieve the torque resulting from flex leads 30 when the gyrocompass aligns with true north.

The basic equation of gyro precession is $\tau = H\omega_e \cos\lambda \sin\phi$ where:

$\tau$ = precession torque
$H$ = spin motor angular momentum
$\omega_e$ = Earth rotation rate
$\lambda$ = local latitude
$\phi$ = angle of spin axis displacement from true North.

In a gimbaled type of rate sensor any misalignment of the input axis from the horizontal plane will cause a bias torque in direct proportion to the misalignment angle $\theta_E$, $\tau_E = H\omega_e \sin\lambda \sin\theta_E$. For a pendulous gyro of effective length $l$, however, the vertical component of the earth rotation rate will cause the spin vector to tilt until the pendulous torque, $mgl\theta_\lambda$, equals the precession torque, $H\omega_E \sin\lambda$. This tilt does not affect the north seeking property, which is solely dependent upon the term $H\omega_e \cos\lambda \sin\phi$, where $\phi$ is the angle between the spin axis and the meridian plane and $\theta_\lambda$ is the angle of spin axis tilt due to the vertical component of the earth rotation rate.

Thus spin motor 17 will precess the conventional inertial element until spin axis 18 aligns to true north. As the inertial element precesses, the rotational error angle between pendulum arms 29 and 29' and follow-up assembly 10 increases. Electromagnetic pickoffs 19 and 19' sense this difference. Pickoffs 19 and 19' are located between follow-up assembly 10 and pendulum arm 29, adjacent to spin motor 17. Pickoffs 19 and 19' are shown as being electromagnetic, however it is within the scope of the invention to use digital encoders in combination with a digital-to-analog converter in place of the electromagnetic pickoffs.

Figure 3:
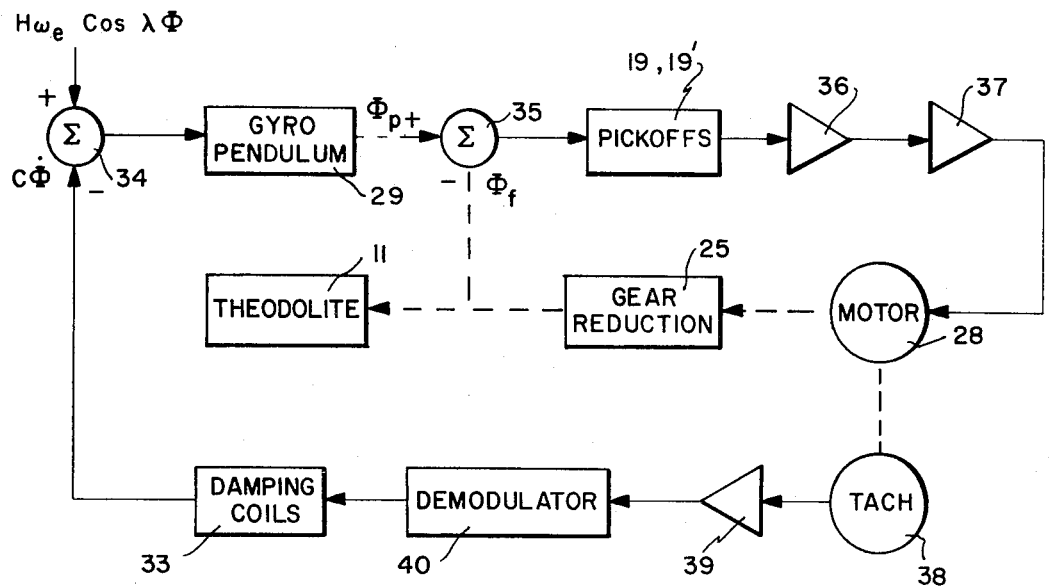
FIG. 3 is a block diagram of the system hardware of FIG. 1.

Referring to FIGS. 1 and 3, a block diagram of the system hardware of the pendulous gyrocompass is shown. Pickoffs 19 and 19' produce an output as the rotational error between pendulum arm 29 and follow-up assembly 10 increases. This error is amplified by preamplifier 36 and amplifier 37. The amplified error signal is used to drive servo motor 28, which in turn drives follow-up assembly 10 via gear reduction 25. It should be noted that the dotted lines in FIG. 3 indicate a mechanical connection. Thus in response to the amplified error signal from pickoffs 19 and 19', servo drive motor 28 causes follow-up assembly 10 to follow spin axis 18 of the inertial element so that follow-up assembly 10 and spin axis 18 are in alignment with true north.

As spin axis 18 of the inertial element aligns to true north, overshoot of true north may occur. To prevent or damp this, motor 28 also drives a tachometer 38. The output of tachometer 38 is amplified by tachometer amplifier 39 and rectified by demodulator 40. Damping coils 33 are electromagnetically actuated and provide damping between follow-up assembly 10 and pendulum arm 29, as shown in FIGS. 1 and 3. An example of damping by electromagnetic coils is found in U.S. Pat. No. 3,512,264 to L. R. Ambrosini. Thus the rate of turn between follow-up assembly 10 and pendulum arm 29 can be electromagnetically controlled. The damping coils are actuated only when tachometer 38 produces an output, thus the overshoot of pendulum arm 29 is damped as the pendulum arm oscillates about alignment with true north.

Referring to FIG. 3, the damping force $C\phi$ and the precession force $H\omega_e \cos\lambda\phi$ are summed by summer 34 to act upon pendulum arms 29 and 29'. The term $\phi_p$ represents the angle of deviation of spin axis 18 from true north and $\phi_f$ represents the angle of deviation from true north of the zero mark of compass card 44. The angles of deviation from true north of pendulum arm 29 and follow-up assembly 10 are summed by summer 35 and represent the relative error angle between the two, and this angle is sensed by pickoffs 19 and 19' which produce an error voltage for the servo loop.

Thus the zero mark of compass card 44 is driven to true north by motor 28 in response to the output of pickoffs 19 and 19'. By rotating theodolite 11 with respect to the compass card, headings from true north may be obtained. Theodolite 11 may be clamped by means of screw 43 to rotate with follow-up assembly 10.

The pendulous gyrocompass of the invention further includes means for detaching pendulum arm 29' from pendulum 29. Pendulum arm 29' is detached by means of screw threads 42. Similarly, lower housing 24 may be detached from housing 14 via screw threads 41. A viscous fluid 26 is provided in the lower well of housing 24 to provide viscous damping for lower pendulum arm 29'.

For convenience, caging means are provided for pendulum arm 29 by means of uncaging drive 21, caging spring 22 and caging screw 23 as shown in FIG. 1. Caging spring 22 normally forces caging screw 23 against detent 45 in the housing for gyro motor 17. When uncaging drive 21 is rotated, caging screw 23 is retracted from the housing for gyro 17 and caging spring 22 is wound up tight.

A magnetic shield, 20, is placed adjacent to the lower portion of sensor housing 14 as shown in FIG. 1 Magnetic shield 20 aids in shielding pendulum arm 29 and spin motor 17 from external magnetic fields.

What is claimed is:
1. A pendulous gyrocompass comprising:
a follow-up assembly, including a container portion, having rotational freedon about a vertical axis;
a Newtonian fluid in said container portion;
a hollow sphere buoyantly floated in the Newtonian fluid;
a first pendulum arm, having an upper end fixedly attached to said hollow sphere, said pendulum arm having a lower end depending below said container portion, and said lower end including first means for coupling to a second pendulum arm;
a gyro rotor rotatably mounted on the lower end of said first pendulum arm for rotation on an axis transverse to said vertical axis;
a second pendulum arm having an upper end and a lower end, said upper end including second means for coupling to said first means for coupling on said first pendulum arm and said last named lower end comprising a heavy mass;

means for sensing the azimuthal displacement of said first pendulum arm relative to said follow-up assembly;

a position servo loop responsive to said means for sensing azimuthal displacement causing said follow-up assembly to track said first pendulum arm in azimuth; and an indicator fixedly attached to said follow-up assembly; so that said indicator aligns to the true north in response to the north seeking movement of said gyro rotor.

* * * * *